United States Patent [19]

Field et al.

[11] Patent Number: 5,446,811
[45] Date of Patent: Aug. 29, 1995

[54] THERMALLY ACTUATED OPTICAL FIBER SWITCH

[75] Inventors: Leslie A. Field, Portola Valley; Richard C. Ruby, Menlo Park, both of Calif.

[73] Assignee: Hewlett-Packard Company, Palo Alto, Calif.

[21] Appl. No.: 212,543

[22] Filed: Mar. 14, 1994

[51] Int. Cl.⁶ .................................................. G02B 6/26
[52] U.S. Cl. ......................................... 385/23; 385/22
[58] Field of Search .................... 385/16, 20, 21, 22, 385/23, 25

[56] References Cited

U.S. PATENT DOCUMENTS

| | | | |
|---|---|---|---|
| 4,834,488 | 5/1989 | Lee | 350/96.2 |
| 4,896,937 | 1/1990 | Kraetsch et al. | 350/96.20 |
| 4,938,552 | 7/1990 | Jebens et al. | 350/96.2 |
| 4,946,236 | 8/1990 | Dautartas et al. | 350/96.20 |
| 5,208,880 | 5/1993 | Riza et al. | 385/18 |
| 5,268,975 | 12/1993 | Yoshitani et al. | 385/16 |

FOREIGN PATENT DOCUMENTS

| | | | |
|---|---|---|---|
| 3716836 | 12/1988 | Germany | 385/23 |
| 2176023 | 12/1986 | United Kingdom | 385/22 |
| WO92/95460 | 4/1992 | WIPO | G02B 6/32 |

OTHER PUBLICATIONS

Guckel, H. et al., "Thermo-Magnetic Metal Flexure Actuators," *Technical Digest, IEEE Solid-State Sensors and Actuator Workshop*, Jun. 1992, pp. 73-75.

Jebens, R. et al., "Microactuators for Aligning Optical Fibers," *Sensors and Actuators*, 20 (1989), pp. 65-73.

Kim, Young W. et al., "Micromechanically based integrated optic modulators and switches," *Proceedings SPIE, Integrated Optics and Microstructures*, vol. 1793, Sep. 1992, pp. 1983-1989.

Nagaoka, Shinji, "Micro-Magnetic Alloy Tubes for Switching and Splicing Single-Mode Fibers," *Proceedings, IEEE Micro Electro Mechanical Systems*, Jan. 30–Feb. 2, 1991, pp. 87-91.

Riza, Nabeel A., "Micromechanical Fiber-optic switches for optical networks," *Proceedings SPIE, Integrated Optics and Microstructures*, vol. 1793, Sep. 1992, pp. 108-126.

Primary Examiner—Rodney B. Bovernick
Assistant Examiner—John Ngo

[57] ABSTRACT

A micromachined device for selectively switching an optical fiber between a first and a second position includes a working leg that undergoes a greater degree of thermal expansion than a second leg with the conduction of an electrical current through the two legs. In a preferred embodiment, the working leg has a cross-sectional area that is less than that of the second leg, thereby presenting a greater electrical resistance to the current flow. The legs are each fixed to a substrate at first ends and are interconnected at second ends that are free to move relative to the substrate. The difference in electrical resistance provides a differential in thermal expansion, as the working leg lengthens to a greater degree than the second leg. The working leg deforms the second leg and the optical fiber is pressed into a second position until current flow is terminated. In another embodiment, the differential in thermal expansion is created by ensuring that the second leg has less thermal isolation from the substrate than the thermal isolation of the working leg from the substrate.

20 Claims, 7 Drawing Sheets

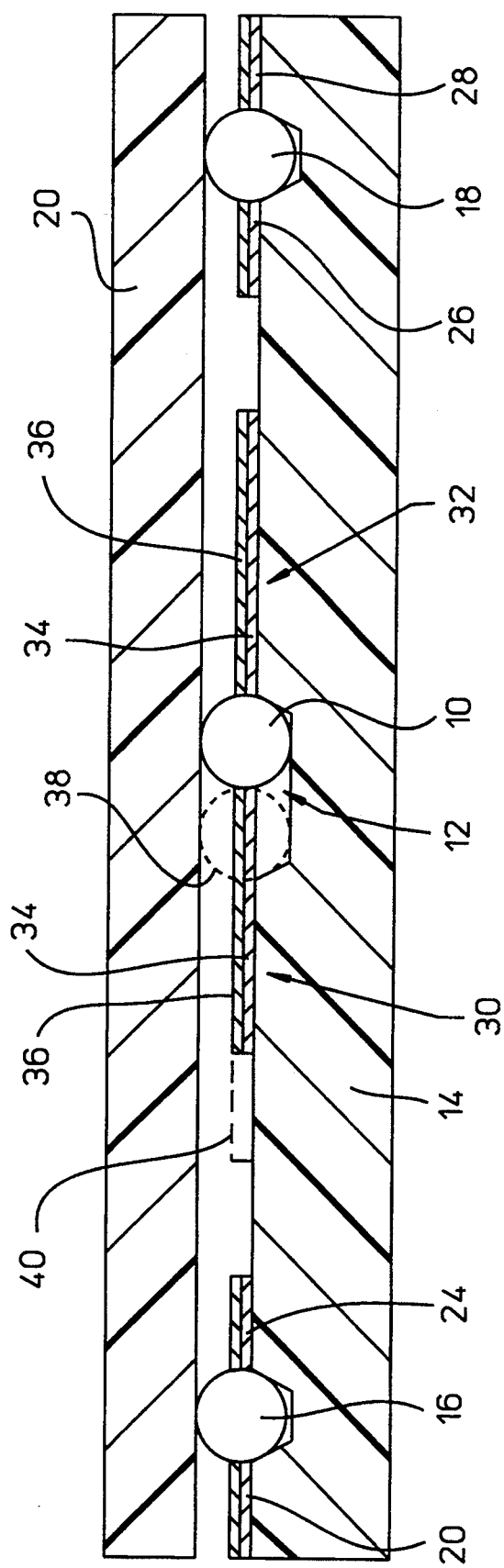
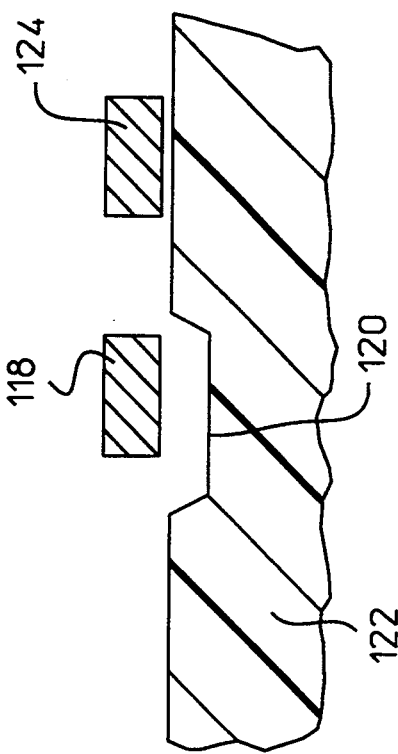
FIG. 1
FIG. 6

THERMALLY ACTUATED OPTICAL FIBER SWITCH

TECHNICAL FIELD

The present invention relates generally to fiberoptic transmission systems and more particularly to optical fiber switching and repositioning.

BACKGROUND ART

Lightwave communication systems allow high speed, high performance transmission of information. For example, information in the fiberoptic communication system may be sent in the form of optical pulses at a rate of 100 to 2,500 megapulses per second.

Switches for steering optical transmission are typically described according to the numbers of inputs and outputs affected by the switching. An optical fiber switch having "m" inputs and "n" outputs would be referred to as a m×n switch. For example, a switch that repositions a single input optical fiber to connect either of two output optical fibers is a 1×2 switch.

An optical fiber switch is described in U.S. Pat. No. 4,896,937 to Kraetsch et al. A V-shaped groove supports a fixed optical fiber and a switchable optical fiber in optical alignment. The groove has sections of different dimensions that receive and align sheathed and unsheathed portions of the two fibers. A covering structure mates with the base member for covering at least a part of the sheath fiber portions. A ferromagnetic assembly may be used to selectively move the switchable fiber into and out of alignment with the fixed fiber. U.S. Pat. No. 4,946,236 to Dautartas et al. also describes a magnetically activated optical fiber switch to selectively reposition fibers located in V-shaped grooves.

Piezoelectric actuators are also utilized. U.S. Pat. No. 5,208,880 to Riza et al. describes a microdynamical switch that includes a number of piezoelectric bars mechanically coupled together in series in a meander-line geometry. A mirror is secured to the bars so that the cumulative deflection of the bars is used to displace the mirror. The amount of displacement is governed by a controllable voltage source that applies a voltage across the piezoelectric bars. The position of the mirror controls optical communication between fibers.

Each of the prior art switching mechanisms works well as designed. However, what is needed is an optical fiber switch that provides a high degree of reliability in a cost efficient manner and that allows integration with fiber-support structure and any desired electrical circuitry.

SUMMARY OF THE INVENTION

The invention provides a thermally deflectable switch for selectively moving an input optical fiber relative to an output optical fiber. Typically, the switching is achieved by displacing a fiber from a first position in optical alignment with a fixed fiber to a second position in which the two fibers are disconnected. The thermally deflectable switch includes a working leg and a second leg that are electrically conductive. A thermal expansion differential with respect to the two legs is established in order to effect displacement of the fiber. The thermal expansion differential can be effected by a difference between the two legs with respect to the generation of heat by the legs or the input or output of heat to or from the legs.

In a preferred embodiment, the thermal expansion differential is achieved by forming two legs to have significantly different cross-sectional dimensions, so that the working leg has a greater electrical resistance. The difference between resistance to current flow causes the working leg to expand to a greater extent than the second leg. The two legs are positioned to deflect in a direction to move the switching optical fiber. Termination of the electrical current relaxes the switch, so that the optical fiber may be returned to the original position. Preferably, a second thermally deflectable switch is positioned to provide a positive force for returning the fiber.

In the preferred embodiment, the thermally deflectable switch is a device formed on a semiconductor substrate. For example, photolithographic techniques may be utilized to form a mold to define the structure of the working leg and the second leg. Each leg is fixed to the substrate at one end and is free to move relative to the substrate at the opposite end. The free ends of the legs are connected together. The free ends of the legs may be connected by a bridge, but this is not critical.

In another embodiment, the thermal expansion differential is achieved by coupling the legs to the substrate in a manner that allows the second leg to dissipate thermal energy into the substrate more efficiently than does the working leg. For example, a trench may be formed below the working leg to more effectively isolate the working leg from the substrate. Consequently, the working leg will undergo a greater thermal expansion. The greater increase in length of the working leg causes the working leg to deflect the second leg. The deflection of the second leg pushes the movable optical fiber from the first position to the second position.

In another embodiment, the thermal expansion differential is achieved by providing unequal heating to the legs. The two legs may have heaters formed on a surface, with the working leg receiving a greater amount of thermal energy. For example, different serpentine patterns of nickel may be formed on the two legs.

Support structure for at least the movable optical fiber is also formed on the substrate. For example, a trench may be formed in the substrate to receive the fiber. The depth of the trench is selected to position the fiber for movement by the switch.

A suitable selection of materials is one in which an electroplated nickel forms the legs on a silicon substrate. The Young's moduli of conventional optical fiber materials are lower than the Young's modulus of nickel. Consequently, the fiber is easily movable by the nickel switch. The nickel may be coated with gold. Optionally, drive circuitry is formed on the silicon substrate to control the current through the two legs for precise positioning of the movable optical fiber. The optical fiber may then be moved between more than two selected positions. That is, a 1×n switch may be formed, with n designating more than two outputs. Moreover, the number of inputs may be greater than 1.

By using micromachining techniques to fabricate the switch, the device may be fabricated at a low cost and with a high degree of integration with fiber-support structure and with electrical support circuitry. The switch is integratable with standard processing for such circuitry.

BRIEF DESCRIPTION OF THE DRAWINGS

FIG. 1 is a side cross-sectional view of a first embodiment of a fiberoptic switching assembly in accordance with the invention.

FIG. 6 is a side cross-sectional view of a fourth embodiment of a thermally deflectable switch.

BEST MODE FOR CARRYING OUT THE INVENTION

Figure 2:
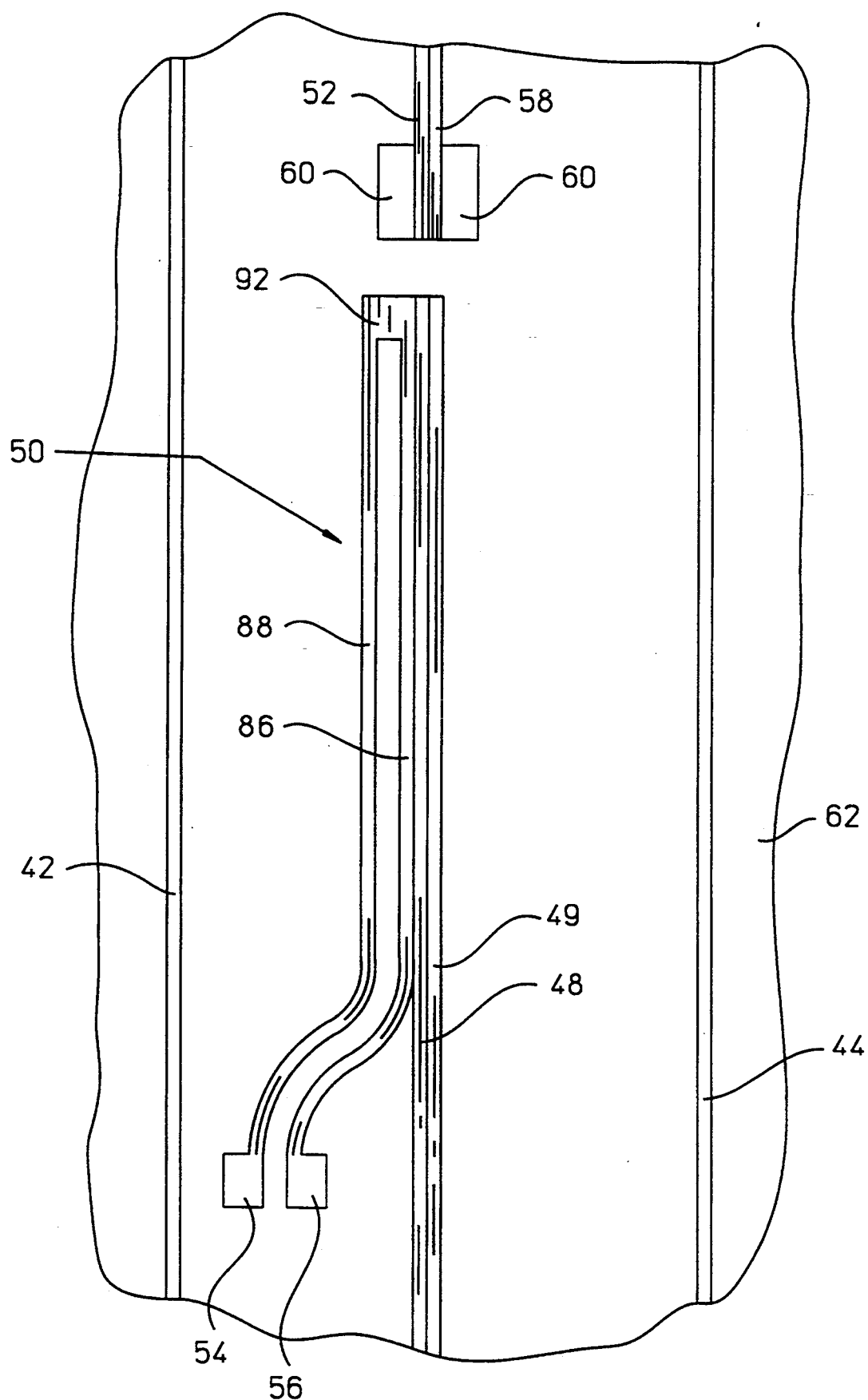
FIG. 2 is a top view of a second embodiment of a thermally deflectable switch in accordance with the invention.

With reference to FIG. 1, a movable optical fiber 10 rests on a trench surface 12 of a substrate 14. Typically, the substrate is a semiconductor wafer. The optical fiber is a conventional member of the type for transmitting lightwave signals. An acceptable depth of the trench that receives the optical fiber is 42.5 $\mu$m. In the preferred embodiment, the depth of the trench is selected so that the midpoint of the optical fiber is aligned with the midpoints of switch actuators 30 and 32 for repositioning the optical fiber. This alignment reduces the risk of the fiber being pushed upwardly or downwardly by the switch actuators.

The substrate 14 includes two parallel trenches to seat first and second spacer optical fibers 16 and 18. An upper substrate 20 rests on the spacer optical fibers. The two trenches which receive the spacer optical fibers 16 and 18 are formed to a width at which the spacer fibers rest against the sides and not the bottoms of the trenches. Consequently, the upper substrate does not rest upon the center fiber 10, so that the movable optical fiber 10 is able to slide from side to side within the center trench 12. Alternatively, the spacer optical fibers may have a diameter slightly greater than that of the movable optical fiber to prevent the upper substrate 20 from interfering with movement of the optical fiber 10. As a third alternative, the side trenches may be shallower than the center trench 12.

The distance between the two substrates 14 and 20 is approximately 85 $\mu$m. However, this is not critical. Each spacer optical fiber 16 and 18 is positioned between opposed restraint bars 22, 24, 26 and 28. The restraint bars are formed of nickel with an optical gold coating, since the restraint bars can then be formed simultaneously with first and second thermally deflectable switch actuators 30 and 32. The thickness of the metal on the semiconductor substrate 14 may be 20 $\mu$m, but the thickness may be varied in accordance with considerations to be described below and with principles well understood by persons skilled in the art.

Each of the first and second thermally deflectable switch actuators 30 and 32 is formed of a nickel layer 34. Optionally, a thin coating of gold 36 may be applied. The material for forming the underlayer is determined at least partially by the Young's modulus of the material. Since the switch actuators 30 and 32 must be capable of readily displacing the movable optical fiber 10, the Young's modulus of at least one of the layers of the switch actuators must be significantly greater than the Young's moduli of the optical fiber materials.

The purpose of the optional gold coating 36 is to allow some deformation of the switch actuators 30 and 32 upon contact with the movable optical fiber 10. While not shown, the gold coating extends along the entire interface of the actuator with the optical fiber 10. The deformation provides a groove at the interface to achieve a more reliable displacement of the fiber with movement of the actuators.

The movable optical fiber 10 is shown in a first position. In a manner described fully below, the first thermally deflectable switch actuator 30 is activated to slide the fiber from a second position 38, shown in phantom. The second thermally deflectable switch actuator 32 is in a relaxed state. The optical fiber 10 can be moved from the first position to the second position 38 by deactivating the first switch actuator 30 and activating the second switch actuator 32. When deactivated, the first switch actuator 30 moves to the position shown by dashed lines 40 in FIG. 1.

FIG. 2 is a top view of a fiberoptic transmission scheme having an upper substrate removed. As in FIG. 1, spacer optical fibers 42 and 44 rest within trenches of a substrate 62 to ensure proper spacing between the substrates. A movable signal optical fiber 48 extends along a trench 49 that is parallel to the spacer fibers 42 and 44. A thermally deflectable switch actuator 50 includes a working leg 88 and a second leg 86. As will be explained fully below, the legs are formed with the substrate in a manner to cause a difference in the thermal expansions of the legs when the legs are connected to a source of current.

Unlike the embodiment of FIG. 1, the signal optical fiber 48 is selectively repositioned by only the one switch actuator. The fiber 48 can be bonded to the second leg 86, or return of the fiber can be dependent solely upon the restoring force when the fiber is allowed to return to a rest position following deformation below the elastic limit of the fiber.

The thermally deflectable switch actuator 50 is in a relaxed state. In this state, the movable optical fiber 48 is aligned optically with a first fixed optical fiber 52. The switch actuator 50 includes pads 54 and 56 for connection to a source of current. Current flow through the legs 86 and 88 causes a deflection of the switch actuator in a clockwise direction, moving the optical fiber 48 into alignment with a second fixed fiber 58. The movable fiber 48 may be a source of an input signal, while the fixed fibers 52 and 58 may be output fibers. Repositioning the movable fiber 48 optically disconnects the fiber from signal communication with one output fiber for optical connection with the other output fiber.

Typically, some structure is provided to ensure precise alignment of the fibers 48, 52 and 58. For example, the trench that receives the movable fiber is used to limit the movement of the input fiber 48. Optional restraint bars 60 combine with the trench that receives the fixed fibers 52 and 58 to secure the fixed fibers. Optionally, restraint bars may be used with the movable fiber. For example, one restraint bar may be positioned to the left of the working leg 88 in FIG. 2, while a second restraint bar may be positioned to prevent movement of the fiber past a position in which the movable fiber is optically connected to the second fixed fiber 58.

Figure 3:
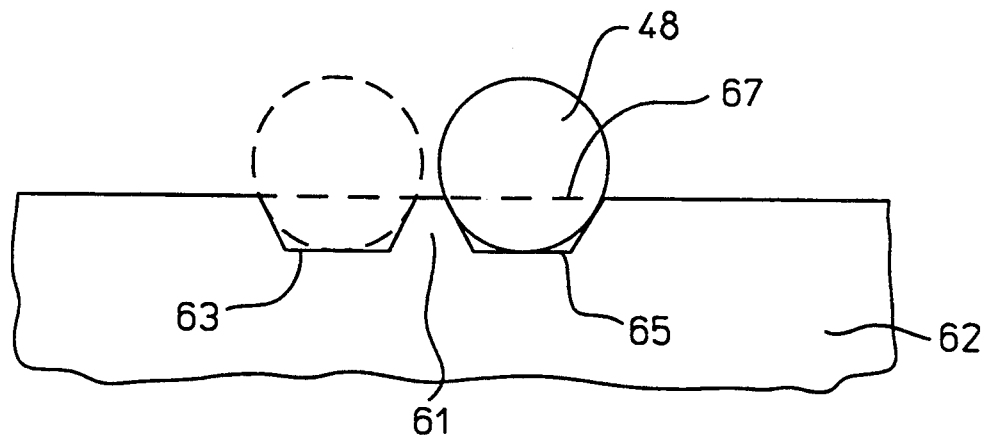
FIGS. 3 and 4 are side cross-sectional views of alternative configurations of trenches for precisely positioning an optical fiber.

In FIG. 3, the movable signal optical fiber 48 is shown as having first and second positions on opposite sides of a step 61 centered within a trench that receives the fiber. The step is an optional feature that is employed to precisely align the fiber relative to another optical fiber. In the embodiment of FIG. 3, first and second trenches 63 and 65 are formed into a substrate 62. To accomplish this, the upper surface of the substrate is selectively masked. Exposed regions of the upper surface are etched. As will be understood by persons skilled in the art of patterning a semiconductor substrate, the masking is defined in a manner to protect the center of the trench so as to leave the step 61. In operation, a first thermally deflectable switch actuator, not shown, is positioned to provide a force for pressing the optical fiber 48 from the position shown by a solid line to the position shown in phantom on the opposite side of the step 61. A second switch actuator is used to selectively return the fiber to the original position. In either position, the inclined edges of the step and the trench determine the rest position of the fiber.

A positive end stop 67 is shown in phantom in FIG. 3. The end stop is another feature that aids in achieving a desired position for optical alignment with an output fiber. Efficient transmission of a signal from a first fiber to a second fiber requires that the distance between the fibers not exceed some limit, e.g., 21 $\mu$m. By providing a positive end stop 67, the distance can be more easily maintained. The positive end stop forms a structure that enables a precise positioning of the fiber for equal signal losses in an application in which switching is between two other fibers. The method of forming the positive end stop is not critical.

Figure 4:
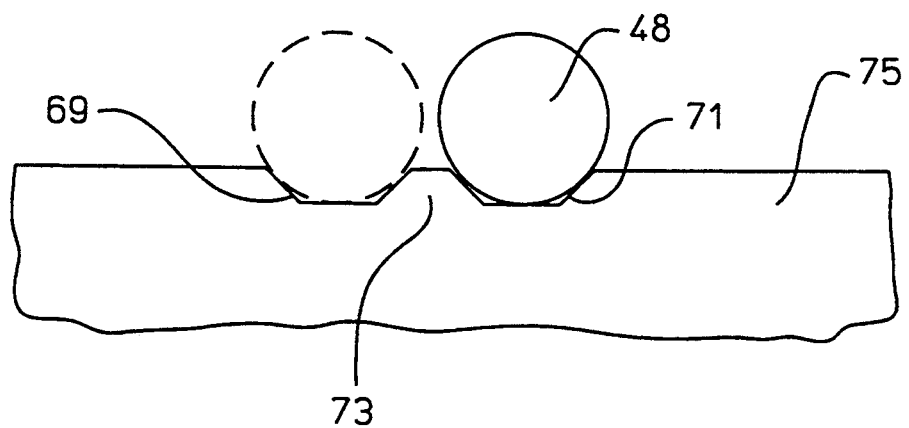

In FIG. 4, a bifurcated trench is shown as including first and second portions 69 and 71 on opposite sides of a step 73. The step is formed by selectively etching a layer or a substrate 79 to remove material in a pattern to define the portions 69 and 71 of the trench. As in the embodiment of FIG. 3, the optical fiber 48 is switched between the first and second portions 69 and 71 by a pair of thermally deflectable switch actuators, not shown.

Ideally, current flow through the working and second legs 86 and 88 of FIG. 2 can be used as the means for precisely aligning the movable fiber 48. In an absence of current flow the input fiber 48 is aligned with the first fixed fiber 52. At a first current level, the switch actuator 50 deflects in a clockwise direction to align the fiber 48 with the second fixed fiber 58. A greater current flow can then be used to further deflect the switch, optically isolating the movable fiber 48 from both of the fixed fibers. Alternatively, a greater number of fixed fibers can be positioned in side-by-side relationship for optical coupling with the movable fiber 48 in accordance with the current flow through the legs 86 and 88.

Figure 11:
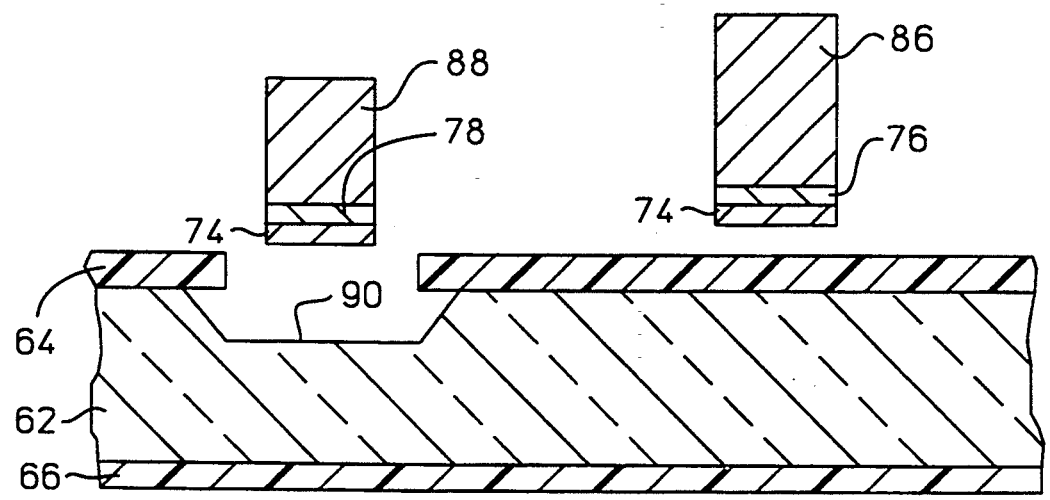

In the preferred embodiment, the deflection of the thermally deflectable switch actuator 50 is a direct result of a difference in cross-sectional areas of the two legs. Referring briefly to FIGS. 2 and 11, at least a portion of the working leg 88 has a thickness that is significantly greater than that of the second leg. Because the second leg has a greater cross-sectional area, it has a lower electrical resistance than the working leg. When a current is passed through the working leg and the second leg, the working leg will undergo a greater temperature change than the second leg, creating a differential of thermal expansion.

The working leg 88 is connected to the second leg 86 by a bridge 92. While the two legs are fixed to the substrate 62 at the pads 54 and 56, the legs are free to move relative to the substrate at the ends connected to the bridge 92. As the working leg 88 expands to a greater degree than the second leg 86, the resulting difference in the two lengths of the legs causes the switch actuator 50 to deflect in a clockwise direction at the bridge 92. The difference in the two lengths is a result of the differential of thermal expansion of the legs. The clockwise deflection switches the movable optical fiber 48 from alignment with the fixed fiber 52 into alignment with the second fixed fiber 58. While not critical, the two legs are shown as being of equal length when the switch actuator 50 is in a relaxed state. For a given difference in the two lengths of the legs due to a temperature differential, the amount of deflection of the switch actuator is proportional to the original lengths of the legs. Each leg may have a length of 4800 $\mu$m. Optionally, the working leg 88 may have a length greater than that of the second leg 86, with the working leg meandering or arcing to direct contact with the second leg. There is an inverse relationship of the gap between the two legs and the deflection of the switch resulting from the difference in thermal expansions of the legs. An acceptable gap is 120 $\mu$m, but this is a dimension that is not critical to operation.

Figure 5:
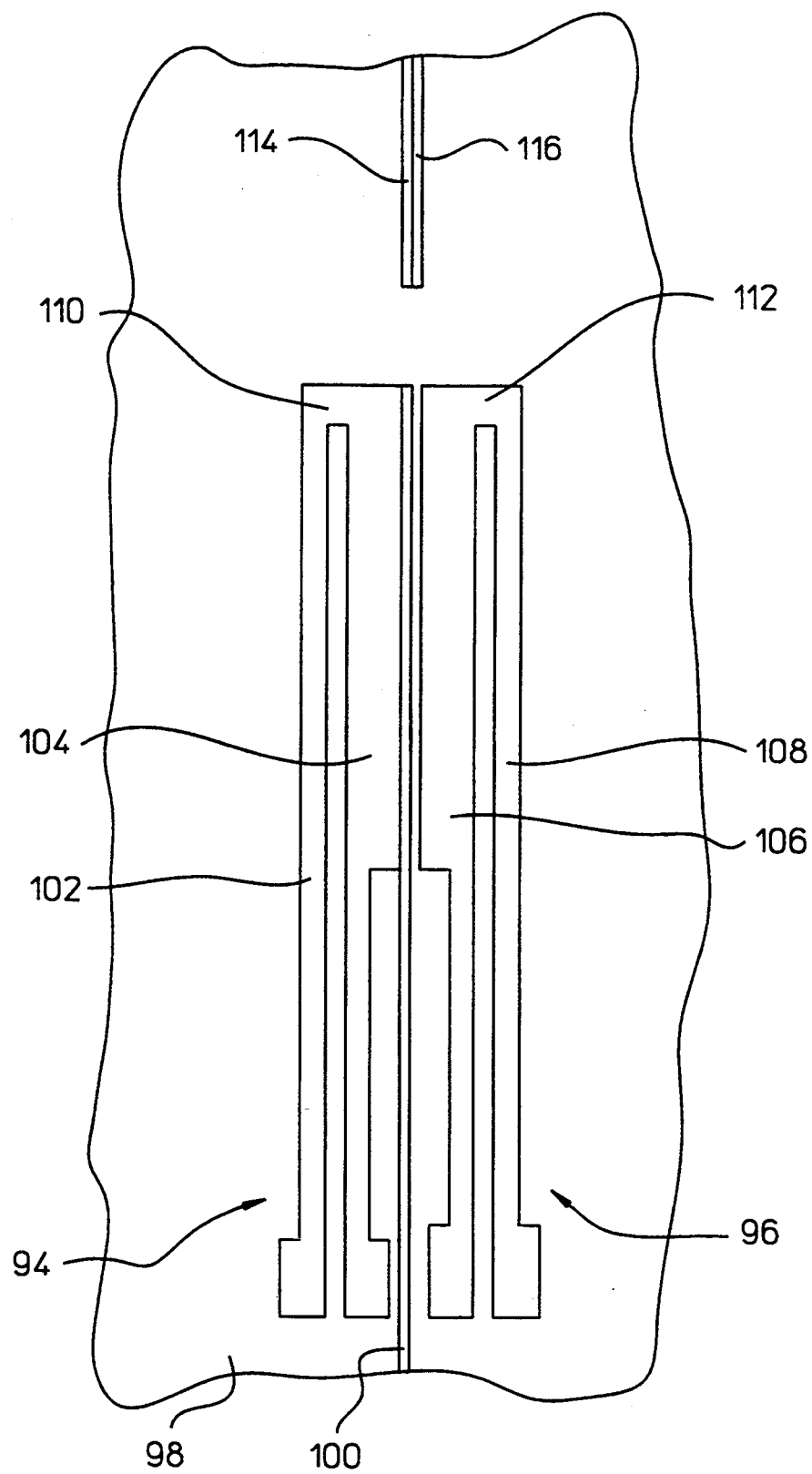
FIG. 5 is a top view of a fiberoptic switching assembly having a pair of thermally deflectable switches.

Another embodiment of a thermally deflectable optical switch actuator is shown in FIG. 5. Two switch actuators 94 and 96 are formed on a substrate 98 at opposite sides of a movable optical fiber 100. The first switch actuator 94 has a working leg 102 having a movable end that is less wide than a movable end of a second leg 104. Likewise, the second switch actuator 96 has a thin working leg 108 and a leg 106 that is wider at a movable end. Because the working legs 102 and 108 of the actuators present an electrical resistance greater than the outer portions of the second legs 104 and 106, the working legs will undergo a greater degree of thermal expansion. As the working leg of an actuator expands to a greater extent than the thicker leg, the actuator begins to deflect. The thermal expansion differential generates stresses which deflect the first switch actuator 94 in a clockwise direction. On the other hand, current flow through the legs of the second switch actuator 96 will cause deflection in a counterclockwise direction .

In operation, the position of the movable optical fiber 100 relative to a pair of fixed input fibers 114 and 116 is dependent upon current flow through the actuators. In a relaxed position, the movable fiber 100 is optically aligned with the first fixed input fiber 114. Current flow through the first switch actuator 94 causes the working leg 102 to reach a higher temperature than the second leg 104. The differential in temperature causes a differential in thermal expansion. As the first switch actuator 94 deflects, the movable optical fiber 100 aligns optically with the second fixed input fiber 116.

Subsequently, the assembly may be returned to the original condition of FIG. 5 by terminating current flow through the first switch actuator 94. Activation of the second switch actuator 96 provides a positive force for the desired return of components. Optionally, the second switch may be smaller than the first switch.

In comparing the embodiments of FIGS. 2 and 5, a difference in thickness of a portion of the two legs of a switch is preferred to a difference in width. As a thicker leg is deflected by a working leg, the thicker leg exerts a restoring force that is proportional to each of the amount of deflection, the moment of inertia of the thicker leg, and the Young's modulus. In the desired direction of motion, the moment of inertia has a $HW^3$ dependence, where H is the thickness (height) of the thicker leg and W is the width of the leg. Where the difference in cross-sectional area is a difference in width, the $HW^3$ dependence translates to a greater restoring force than a comparable difference in leg thicknesses. Thus, the embodiment of FIG. 2 requires less energy to operate. However, the embodiment of FIG. 5 may be preferred in some applications.

There are a number of constraints in the design of an actuator having a restoring first leg and a working second leg. As previously noted, the necessary temperature differential between the two legs may be achieved by forming the working leg to have a cross-sectional area that is less than the cross-sectional area of the restoring leg. The difference in cross-sectional dimensions ensures that the electrical resistance of the restoring leg is sufficiently less than that of the working leg. In a paper entitled "Thermo-Magnetic Metal Flexure Actuators," 0-7803-0456-X/92, 1992 IEEE, Guckel et al. of the University of Wisconsin describe widening a restoring member relative to a working member. While this approach creates the desired area ratio to achieve a higher temperature in the working member with the conduction of electrical current, the approach has the drawback of rendering the restoring member considerably stiffer than the working member. Consequently, the working member of Guckel et al. was formed such that a "buckling" or Euler force of the member was approached. At least to some extent, the concern that the buckling force would be reached was avoided by reducing the width of the restoring member at some distance from the end of the device.

It has been discovered that a preferred configuration for increasing the flexibility of the restoring first leg is one in which the working second leg is actually wider than the restoring leg. While this is contrary to the goal of forming a working leg having a resistance greater than the resistance of the restoring leg, a favorable ratio of cross-sectional areas can be achieved by providing a greater height of the restoring leg relative to the working leg. That is, it is possible to maximize the flexibility, or compliance, of the restoring leg with respect to the working leg by increasing the width of the working leg, while still providing the desired relative resistances. The electrical resistance of the working leg increases only linearly with increasing width, but the relative stiffness increases cubically. How these constraints dictate the relative dimensions can be best seen by an example. If the desired relative ratio of resistances is 2:1, the restoring leg could have a cross-sectional area that is twice the cross-sectional area of the working leg. If it is desirable that the flexibility of the restoring leg be two times greater than the working leg, a solution would be one in which the working leg is twice as wide as the restoring leg, but only 25% as tall as the restoring leg.

Another embodiment is shown in FIG. 6. In this embodiment, a working leg 118 is shown as being suspended over a trench 120 in a substrate 122. On the other hand, a second leg 124 is substantially closer to the substrate. Thus, the second leg 124 will more readily radiate thermal energy into the substrate. It follows that the working leg 118 will undergo a greater degree of thermal expansion. While not shown, the legs are connected at free ends. The differential in thermal expansion causes deflection of the two legs in the same manner as described with reference to FIGS. 2 and 3.

Figure 7:
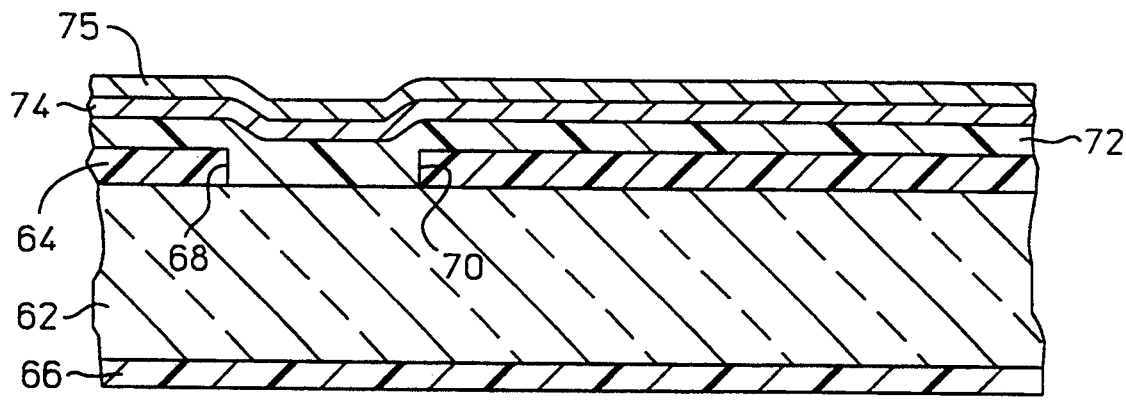
FIGS. 7–11 are side cross-sectional views of process steps for forming a micromachined thermally deflectable switch in accordance with the invention.

FIG. 7 illustrates preliminary steps in fabricating a thermally actuated optical switch actuator on the substrate of FIGS. 1 and 2. The substrate may be a silicon wafer, but this is not critical. Low-stress silicon nitride layers 64 and 66 are deposited on opposite sides of the substrate. Low pressure chemical vapor deposition may be utilized. An acceptable thickness of the silicon nitride is 800 Å. A low-stress material is preferred in order to minimize lateral undercutting during subsequent etching steps, but other suitable etch mask materials may be used, such as stoichiometric silicon nitride.

Photolithographic techniques are then employed to pattern a photoresistive layer so that a portion of the silicon nitride layer 64 can be etched away to form an opening between sidewalls 68 and 70. For example, a photoresist may be spun onto the unetched layer 64, and then exposed. Conventional developing and etching steps may then be employed to pattern the photoresist and the silicon nitride layer 64. The photoresist is not shown in FIG. 5. A plasma etch at 50 W, 0.025 Torr $O_2$, 0.225 Torr $CF_4$ has been used. The photoresist may be stripped using cold KOH.

A layer 72 of PSG or PECVD oxide is then deposited. An acceptable thickness is 2500 Å. The layer is a sacrificial layer that is selectively removed to expose portions of the substrate 62 for processing steps that may be unrelated to the fabrication of the thermally actuated switch assembly. Preferably, the sacrificial layer 72 is wet etched in an HF solution that is diluted to 10:1, or in a buffered etch solution at 5:1 dilution. Etching of selected areas is achieved by using a patterned photoresist layer, not shown. The resist is then removed. Cold KOH can be used to remove the resist.

Figure 8:
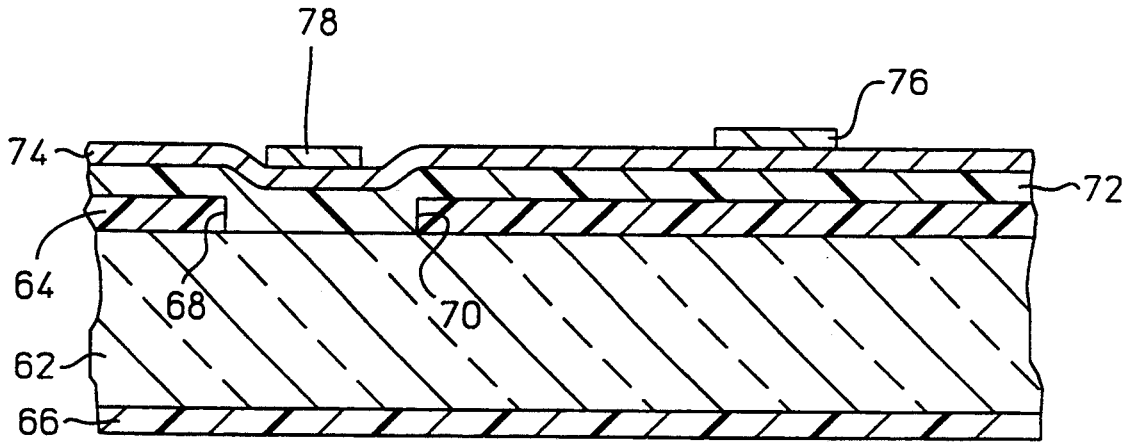

A chromium layer 74 and a nickel layer 75 are then deposited on the substrate 62. Conventional sputtering techniques may be utilized. Photolithographic techniques, including exposing and developing a resist which is not shown in FIG. 7, are then used to pattern the nickel layer 75. The nickel layer may be etched in 33% $HNO_3$ in $H_2O$ at 35° C. The resist may be stripped in cold KOH. As seen in FIG. 8, first and second nickel islands 76 and 78 are thereby formed to act as a seed layer for forming the legs of a thermally deflectable switch assembly. The unpatterned chromium layer 74 functions firstly as an adhesive film in depositing the nickel layer 75 and can subsequently act as an electrical conductor for establishing the desired electrical potential at the two islands 76 and 78 during the electroplating process for forming the actuator legs.

Figure 9:
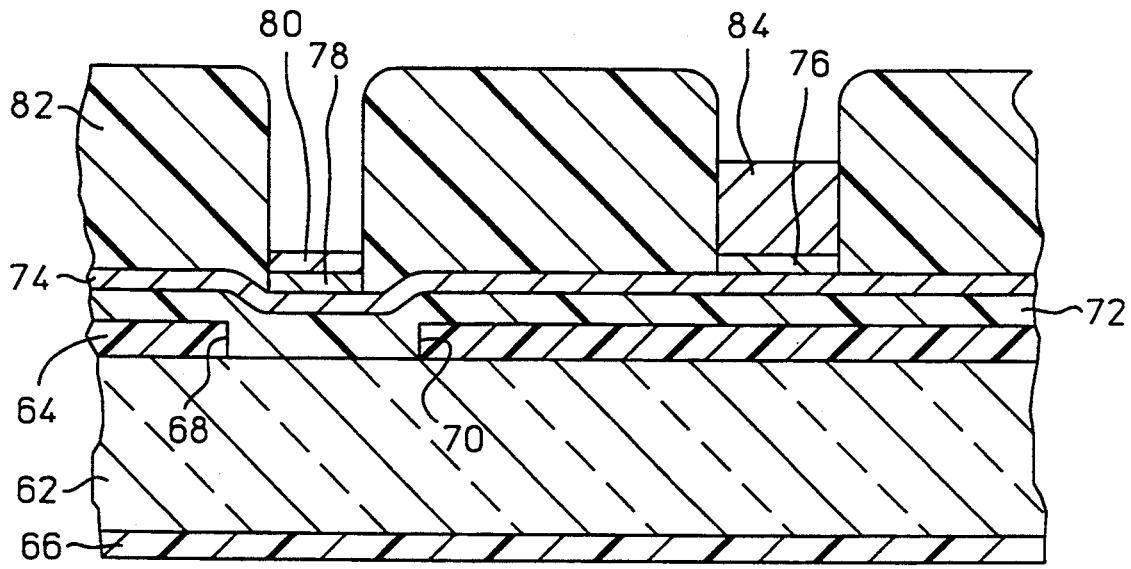

As shown in FIG. 9, a thin layer of PECVD nitride is deposited and patterned to form a cap 80 on the second nickel island 78 so as to prevent nickel from being electroplated on the island. The nitride layer may have a thickness of 5000 Å, but this is not critical. Optionally, a patterned photoresist layer may be used in place of the nitride cap 80.

Figure 10:
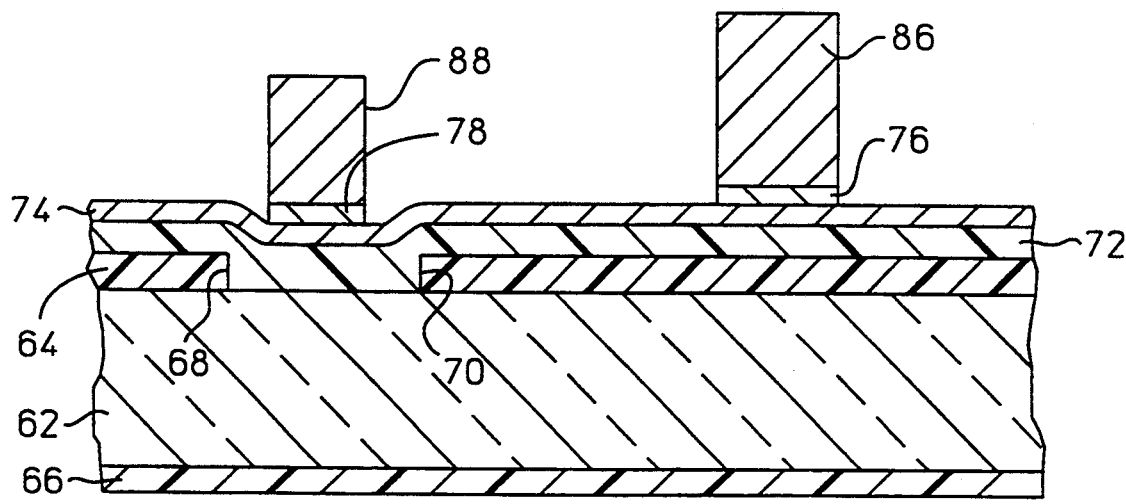

A thick layer 82 of photoresist, photoimageable polyimide or a dry film resist is then spun or laminated onto the substrate 62 and patterned to cover the substrate other than at regions above the first and second islands 76 and 78. A first electroplating process is utilized to form a portion 84 of a switch leg on the first island 76. After nickel has been plated on the first island, the thin nitride layer 80 is stripped from the second island 78. Referring to FIG. 10, a second electroplating process is then initiated, again using conventional techniques. The combination of the two electroplating steps provides a structure in which the second leg 86 above the first island 76 has a thickness, or height, that is greater than that of the working leg 88 on the second island by an amount equal to the thickness of the nickel 84 shown in FIG. 9. Following the fabrication of the legs, the photoresist, polyimide or dry film resist used in defining the legs is removed. Next, the exposed chromium areas are etched to prevent electrical shorting and to allow access to selective etching of the substrate 62. KOH etching may be employed to form a trench 90 below the "hot" working leg 84, as shown in FIG. 11. If a trench into which an optical fiber is to be received is to have a depth greater than a trench below a leg of the switch actuator, the formation of the trenches can be formed in separate steps. However, this is not critical.

Following formation of the actuator, the optical fibers may be set in place and testing can take place. In addition to the embodiments described above, an actuator having different portions that vary in localized heating to cause deflection for repositioning an optical fiber may be utilized. For example, in FIG. 1, the two switch actuators 30 and 32 may be the two legs of a single actuator. That is, the movable optical fiber 10 may be captured between a working leg and a second leg having different characteristics with respect to thermal expansion, so that resulting deflection of the two legs repositions the optical fiber 10.

In yet another embodiment, each leg of an actuator may be formed of a first material that is electrically conductive and a second material that is thermally conductive, but not necessarily electrically conductive. For example, in FIG. 1 the actuator 30 may have an upper layer 36 of nickel and a lower layer 34 of silicon. The conductive layer should be patterned to act as a heater when current is conducted through the layer. A serpentine pattern of nickel may be formed upon the silicon layer. A portion of the generated heat will conduct into the silicon layer. If the two legs have different cross-sectional areas, the actuator will operate in the same manner as described in referring to FIGS. 1 and 2. The materials and the design of the actuator should be selected to achieve the lateral movement of the actuator. The thickness of the legs and the difference of coefficients of thermal expansions must be considered, so that a bimorphic leg is not caused to bend in an undesired direction as a result of a differential of expansions. Optionally, the optical fiber may be positioned within a narrow trench, so that force exerted by a thermally deflectable switch causes the fiber to ramp upwardly along an anisotropically formed trench wall. Thus, the major component of motion by the fiber is in a vertical direction, rather than in the horizontal direction as shown in the embodiments of FIGS. 1–3.

Figure 12:
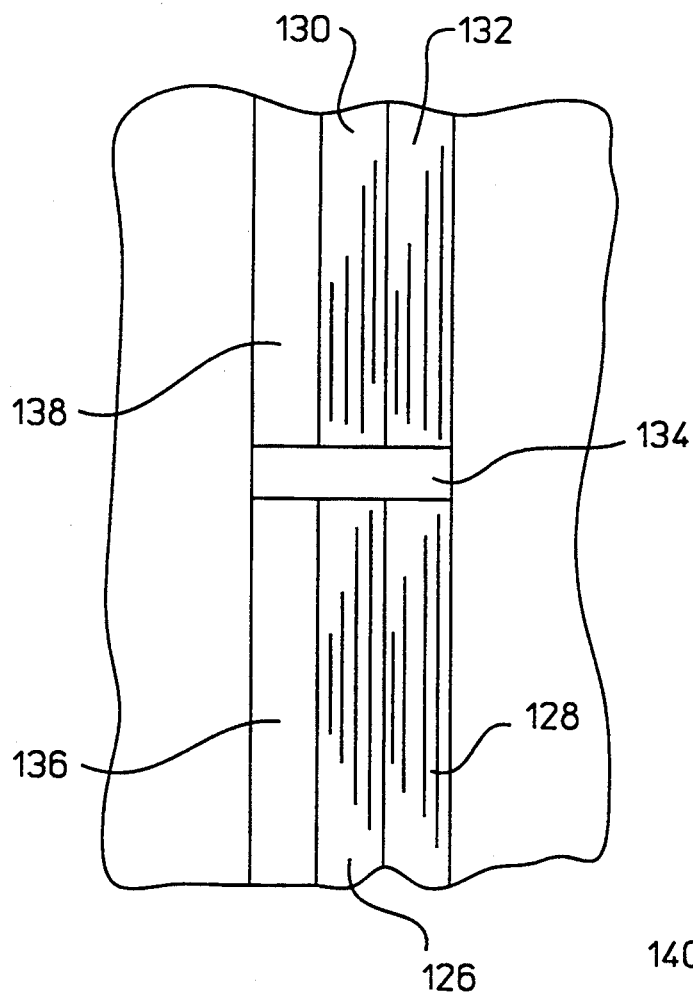
FIG. 12 is a top view of a 2×2 arrangement of optical fiber switching.

With reference to FIG. 12, a 2×2 switching arrangement is shown as including first and second input fibers 126 and 128 and first and second output fibers 130 and 132. For clarity, the switch actuators for displacing the optical fibers are not shown. In operation, four actuators will be employed, with a separately activated actuator on each side of the input fibers and on each of the sides of the output fibers. A positive end stop 134 fixes the distance between the input and output fibers.

The input fibers 126 and 128 are able to move widthwise within a trench 136. The width of the trench limits fiber movement to a position in which the second input fiber 128 takes the position of the first input fiber 126 in FIG. 12. In like manner, the output fibers 130 and 132 are contained in a trench 138 that limits movement to approximately the width of one of the fibers.

Any one of three alignments can be achieved using the arrangement of FIG. 12. The two input fibers 126 and 128 are shown as being aligned with the two output fibers 130 and 132. By displacing the input fibers to the opposite side of the trench 136, the first input fiber 126 and the second output fiber 132 are isolated with respect to signal transmission, but the second input fiber 128 is optically aligned with the first output fiber 130. Alternatively, the output fibers can be displaced to the opposite side of the trench 138. In this position, the first input fiber 126 is optically aligned with the second output fiber 132, but the second input fiber 128 and the first output fiber 130 are isolated.

Figure 13:
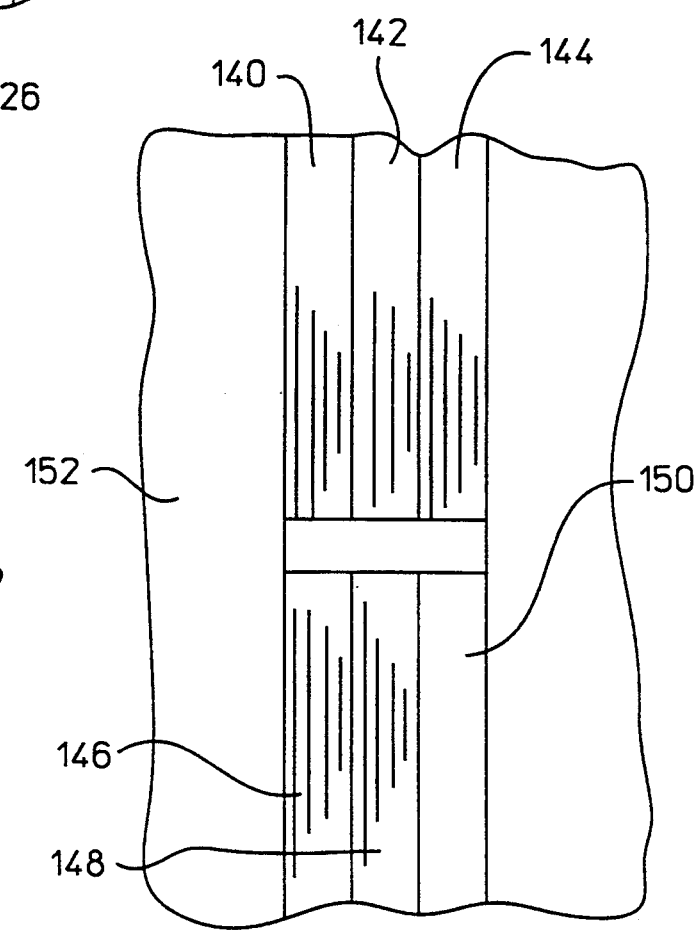
FIG. 13 is a top view of a pseudo 2×2 arrangement of optical fiber switching.

A pseudo 2×2 switching arrangement is shown in FIG. 13. Three output fibers 140, 142 and 144 are fixed in place. First and second input fibers 146 and 148 are received within a trench 150 of a substrate 152. In this arrangement, only two switch actuators are utilized. The actuators are positioned on opposite sides of the trench 150. For clarity, the actuators are not shown.

The second input fiber 148 is shown as being aligned with the center output fiber 142. Displacement of the pair of input fibers 146 and 148 realigns the fibers, so that the first input fiber becomes aligned with the center output fiber 142. The second input fiber 148 is moved into alignment with the previously isolated output fiber 144.

The switching arrangements of FIGS. 12 and 13 are only exemplary. That is, use of the invention described above is not limited to the arrangements of FIGS. 12–13.

We claim:

1. A micromachined device for selectively switching an optical fiber comprising:
   a substrate;
   a movable optical fiber disposed in a first position on said substrate; and
   a thermally operated means for deflecting said movable optical fiber having first and second legs, said first and second legs having characteristics with respect to at least one of generating and releasing thermal energy that are significantly different, thereby having a thermal expansion differential, said first and second legs having a coupling at first ends of said first and second legs, said coupling being displaceable in a direction substantially parallel to a major surface of said substrate, said means for deflecting having input means for connecting said means for deflecting to a source of electrical current, said coupling being positioned adjacent to said movable optical fiber for deflection thereof.

2. The device of claim 1 wherein said coupling of said first and second legs is an electrical connection, said first and second legs are electrically conductive to define a conductive path in which said first and second legs are connected in series.

3. The device of claim 1 wherein at least a portion of said first leg has a cross-sectional area less than a cross-sectional area of said second leg, said first leg thereby having a greater electrical resistance so as to establish said thermal expansion differential.

4. The device of claim 3 wherein said first leg has a thickness, measured perpendicularly with respect to a surface of said substrate, that is less than a thickness of said second leg.

5. The device of claim 3 wherein each of said first and second legs has a width dimension that is parallel to a surface of said substrate on which said means for deflecting is connected, said width dimension of said first leg being less than said width dimension of said second leg.

6. The device of claim 1 wherein said second leg has a thermal communication with said substrate to a greater degree than said first leg has a thermal communication with said substrate, thereby establishing said thermal expansion differential.

7. The device of claim 6 wherein said substrate has a trench under said first leg.

8. The device of claim 1 wherein each of said first and second legs has a heater layer, said heater layer on said first leg generating a greater amount of heat than said heater layer of said second leg, thereby establishing said thermal expansion differential.

9. The device of claim 1 further comprising at least one fixed optical fiber positioned on said substrate for alignment with said movable optical fiber.

10. The device of claim 1 further comprising at least one second optical fiber positioned adjacent to said movable optical fiber for displacement therewith.

11. A micromachined device for selectively switching an optical fiber between a first position and a second position comprising:
   an optical fiber; and
   a thermally controlled deformable switch positioned adjacent to said optical fiber, said thermally controlled deformable switch having a working leg and a second leg, said working leg and said second leg being electrically conductive, said working leg and said second leg having first ends electrically connected to a source of current, said working leg having a thermal expansion responsive to a current flow different from a thermal expansion of said second leg in response to said current flow, resulting in a thermal expansion differential therebetween, said working leg and said second leg being connected at second ends of said working leg and said second legs wherein said thermal expansion differential causes said working leg to deform said second leg in a direction to displace said optical fiber.

12. The device of claim 11 further comprising a substrate, said thermally controlled deformable switch being formed on said substrate, said substrate having support structure for securing said optical fiber for movement between said first and second positions.

13. The device of claim 11 further comprising a stationary fiber disposed to be in optical alignment with said optical fiber when said optical fiber is in said first position.

14. The device of claim 11 wherein said working leg has a cross-sectional area less than a cross-sectional area of said second leg, said working leg thereby having a greater electrical resistance than said second leg.

15. The device of claim 11 wherein said thermally controlled deformable switch has a rest state in an absence of current flow through said working and second legs, said working leg being generally parallel to said second leg when said thermally controlled deformable switch is in said rest state.

16. The device of claim 11 wherein said working leg and said second leg respectively have first and second lengths in the absence of said current flow, said working leg being dimensioned to generate a quantity of thermal energy greater than thermal energy generated by said second leg upon the conduction of current through said working and said second legs, wherein the conduction of current through said working leg extends said working leg beyond said first length to a greater extent than said conduction through said second leg extends said second leg beyond said second length.

17. The device of claim 11 further comprising a second thermally actuated switch on a side of said optical fiber opposite to said thermally controlled deformable switch.

18. An integration of a micromachined device and an optical transmission path comprising:
   a substrate;
   a fixed optical fiber disposed on said substrate;
   a displaceable optical fiber disposed on said substrate, said displaceable optical fiber having an aligned position in which said displaceable and fixed optical fibers are optically coupled and having a second position in which said displaceable and fixed optical fibers are optically decoupled; and
   a thermally actuated means positioned on said substrate for selectively switching said displaceable optical fiber between said aligned and second positions, said thermally actuated means including first and second legs having fixed ends and having free ends, said free ends being connected together and being free to move relative to said substrate, said first and second legs being geometrically incongruent such that an electrical resistance of said first leg is different than an electrical resistance of said second leg, wherein differences in localized heating in response to conducting electrical current through said thermally actuated means cause leg deformations in a direction to press said displaceable optical fiber.

19. The integration of claim 18 wherein at least portions of said first and second legs are different with respect to height from said substrate.

20. The integration of claim 18 wherein said substrate has a trench configured to receive said displaceable optical fiber and to allow movement of said displaceable optical fiber between said first and second positions.

* * * * *